3,509,041
MANGANESE SILICATE-CONTAINING MINERALS AND THEIR USE IN HYDROCARBON CONVERSIONS
Joseph N. Miale, Trenton, N.J., assignor to Mobil Oil Corporation, a corporation of New York
No Drawing. Filed Nov. 28, 1966, Ser. No. 597,243
Int. Cl. C10g *13/02;* B01j *11/58*
U.S. Cl. 208—110                                           18 Claims

ABSTRACT OF THE DISCLOSURE

A catalyst for hydrocarbon conversion comprising a base exchanged, calcined manganese silicate-containing mineral having hydrogen ions bonded thereto.

This invention relates to hydrocarbon conversion catalysts, to the preparation thereof, and to a process for converting hydrocarbons by subjecting the same to contact with said catalysts under conversion conditions.

More particularly, the invention relates to the use of a manganese silicate-containing natural mineral as catalyst in hydrocarbon conversion processes, particularly after enhancement of the catalytic activity of the mineral by base exchange treatment. Thus, a mineral like braunite, it is found, is not only useful in the "as-received" state as a catalyst in hydrocarbon conversions like cracking, but, after base exchange and calcination to form a composite containing hydrogen ions, the utility of the material as a cracking catalyst is considerably enhanced. In terms of alpha activity, described below, braunite in the natural state may have a cracking activity denoted by an alpha value of at least 1.1, which means that it is more active than conventional amorphous silica-alumina, itself a good cracking catalyst. After conversion of the braunite to what may be called the hydrogen form, it exhibits an increased alpha value as high as 17. It may be noted at this point that natural braunite contains a substantial number of alkali metal and alkaline earth metal cations which are exchangeable.

The natural minerals contemplated by the invention include, besides braunite, such minerals as rhodonite, spessarite, helvite, bementite, and manganese nodules, of which braunite is preferred. Braunite is generally considered to be a naturally occurring manganese manganosilicate of the formula $Mn^{+2}Mn_6^{+4}O_8SiO_4$, from which it may be seen that the Mn:Si ratio is 7:1. It has also been represented as $3Mn_2O_3 \cdot MnSiO_3$ and as $Mn_7SiO_{12}$. It has a submetallic luster, a dark color ranging from brownish black to steel gray; a hardness of 6–6.5; and a specific gravity of 4.72–4.83. Generally, the MnO content may vary, depending on the source of the mineral, from about 67 to 82% by weight; the O content from about 6.2 to 8.4%; and the $SiO_2$ content from about 8.1 to 10% by weight. Some iron may be present, and also some calcium and magnesium. Iron as $Fe_2O_3$ may range from about 0.3 to 15.4%; calcium as CaO from about 0.05 to 1.2%; and magnesium as MgO may be of the order of 0.1 to 0.2%. Sodium, when present, is in the range of 0.2 to 0.4%, calculated as $Na_2O$. As indicated by adsorption data, the surface area of braunite is low, being usually less than 5 sq. m./g. The material sorbs 0.178% of cyclohexane, 0.203% of n-hexane, and 0.229% of water, from which it may be concluded that it has a low surface area.

Rhodonite is a manganese silicate of the formula, $MnSiO_3$. It occurs as transparent red crystals of a hardness of 5.5–6.5 and a specific gravity of 3.4–3.68. Spessarite is a manganese aluminum silicate of the formula, $Mn_3Al_2(SiO_4)_3$. It usually contains iron, magnesium, or other elements in minor amounts. Helvite is a silicate mineral of the formula $3(Mn,Fe)BeSiO_4 \cdot MnS$. It is a yellowish to greenish, lustrous material. Bementite is a hydrous silicate of manganese that occurs in grayish yellow radiated masses. It is a manganosilicate of the formula $8MnO_5 \cdot H_2O \cdot 7SiO_2$ having a hardness of 6 and a specific gravity of 3.1. Manganese nodules is the name applied to a naturally occurring marine deposit comprising 11.4–90% $MnO_2$, 2.8–42.3% $SiO_2$, 0.8–44.1% $Fe_2O_3$, 8.7–29.7% water, and 0.3–12.8% alumina. Also present are several calcium salts, comprising on the average about 3.5% calcium carbonate, 0.7% calcium sulfate, and 0.5% calcium phosphate. Small amounts of other materials such as magnesium are present.

As indicated, and as shown in the examples, natural braunite exhibits a catalytic action in the conversion of hydrocarbons. When, however, it is converted to the hydrogen form, in which at least a portion of its alkali metal and/or alkaline earth metal cations are replaced by hydrogen ions, its catalytic action is considerably increased, as is also true of the other described materials. To effect such conversion, the natural braunite is treated with a fluid medium containing hydrogen ion precursors to give a composite which, after calcination, contains hydrogen ions. "Composite" is the term applied to the mineral after a portion, at least, of its alkali and/or alkaline earth metal cations has been replaced by hydrogen ion precursors. The step involved is base exchange, followed by calcination, and the hydrogen ions are bonded to the braunite, thereby forming the composite. The latter is strongly acidic as a result. To illustrate the treatment, the braunite may be arranged in the form of a fixed bed, and the fluid medium in the form of an aqueous solution is passed slowly through the bed at room temperature and atmospheric pressure for a time sufficient to substantially replace the alkali metal cations of the original braunite. The aqueous solution is characterized by having a pH above that at which the braunite decomposes, preferably above 4, more preferably above 4.5. When the treatment is finished, the resulting composite is washed preferably with distilled water until the effluent wash water has a pH between 5 and 8.

Considering the foregoing treatment in more detail, the fluid medium may be aqueous or non-aqueous, preferably aqueous. Polar solvents are useful and these may be aqueous or non-aqueous. The latter include organic solvents which permit ionization of hydrogen-containing substances added thereto, and which include cyclic and acyclic ethers such as dioxane, tetrahydrofuran, diethyl ether, diisopropyl ether, and the like; ketones such as acetone and methyl ethyl ketone; esters such as ethyl acetate, propyl acetate; alcohols such as ethanol, propanol, butanol, etc.; and miscellaneous solvents such as dimethylformamide, and the like. Other fluid media are carboxy polyesters.

A preferred base-exchange procedure comprises treating the mineral with an aqueous solution of a compound which supplies hydrogen ion precursor, such as ammonium ion, washing the material as described, drying it at 100–300° F., and then heating it to a temperature below its decomposition temperature to convert the substituent ammonium ions to hydrogen ions. The ammonium ions may be supplied by such compounds as ammonium chloride, ammonium bromide, ammonium iodide, and ammonium carbonate; other representative ammonium compounds suitable herein are described in U.S. Patent Nos. 3,140,252 and 3,140,253. The concentration of ammonium compound in the base-exchange solution is usually up to 5% by weight but may be higher. It may also be noted that mono-, di-, and trialkylammonium salts, as well as mono-, di-, and triarylammonium salts, are capable of supplying substituted ammonium cations which, on calcination, are converted to hydrogen ions; thus these salts are of value for the base exchange.

Base exchange may be carried out at ambient temperatures and below to temperatures just below that at which the mineral decomposes. Pressures may vary from subatmospheric to superatmospheric, and the duration of treatment is that sufficient to permit substantial replacement of alkali metal and/or alkaline earth metal cations. At the conclusion of the step, the material is dried, as by heating to 100–300 degrees F. for a period of up to 10 or 20 hours. The dried material is then calcined in air at 800 to 1400° F., preferably 1000° F., for up to 20 or more hours. Calcining converts the ammonium or substituted ammonium ion to hydrogen ion. The resulting composite may have bonded thereto at least 0.01 gram, preferably 0.01 to 0.5 gram of hydrogen ions per 100 gram of composite.

If desired, the mineral, either before, during, or after base exchange, may be mixed in any desired way with a matrix, generally comprising an inorganic oxide of porous character, which can serve as a binder and, if suitably chosen, may serve as an auxiliary catalyst. A number of appropriate matrixes are set forth in U.S. 3,210,267 and include silica-alumina gel, silica gel, alumina gel, as well as gels of alumina-boria, silica-zirconia, silica-magnesia, and the like. Natural clays are useful, such as kaolin, attapulgite, kaolinite, bentonite, montmorillonite, etc., and if desired, the clays may be calcined or chemically treated as with an acid or an alkali.

Turning now to a consideration of hydrocarbon conversions, these include cracking, hydrocracking, oxidation, olefin hydrogenation, and olefin isomerization.

Cracking of suitable hydrocarbon stocks is generally carried out at a temperature of 800–1100° F., a pressure ranging from subatmospheric to several hundred atmospheres, and a liquid hourly space velocity (LHSV), i.e., the liquid volume of hydrocarbon per hour per volume of catalyst, or 1 to 10 to produce valuable products in the gasoline boiling range. The charge stock may be any material heretofore used in conventional cracking employing conventional silica-alumina catalyst.

The process may be carried out in any equipment suitable for catalytic operations, and may be operated batchwise or continuously, and with a fixed bed of catalyst or a moving bed wherein the hydrocarbon flow may be concurrent or countercurrent to the catalyst flow. A fluid type of operation may also be employed. The resulting products may suitably be separated by conventional means. Also, the catalyst after use over an expanded period of time may be regenerated in accordance with conventional procedures by burning off carbonaceous deposit from the surface of the catalyst in an oxygen-containing atmosphere under conditions of elevated temperature.

Hydrocracking is generally carried out at 400 to 950° F. For such process, the aforenoted manganese-carbonate containing minerals may suitably be combined with one or more dehydrogenation components, exemplary of which are the metals, oxides and sulfides of metals of Group VI and VIII of the Periodic Table. The hydrogen pressure in such operation is usually within the range of 100 to 3000, preferably 350 to 2000 p.s.i.g. The liquid hourly space velocity is between 0.1 and 10. In general, the molar ratio of hydrogen to hydrocarbon is between 2 and 80, preferably between 5 and 50. Suitable charge stocks comprise petroleum fractions having an initial boiling point of at least about 400° F., a 50% point of at least about 500° F., and an end point of at least about 600° F. Such hydrocarbon fractions include gas oils, residual oils, cycle stocks, whole topped crudes, and heavy fractions from the destructive hydrogenation of coal, tars, pitches, asphalts, and the like.

Hydrocarbon oxidation may be carried out at temperatures of 250 to 1500° F. in the presence of oxygen or air. Mole ratio of charge to oxygen is 1:0.1 to 1:200. The VHSV is 1 to 1000. This reaction is of value in a number of applications, as in automobile exhaust gas catalytic converters where unburned products in the gas are oxidized to $CO_2$ and water.

In olefin hydrogenations the temperature ranges up to 1000° F., the pressure from 10 to 3000 p.s.i., and the LHSV from 0.1 to 10. The operation is useful to form saturated hydrocarbons, to remove gum formers from gasoline, to pretreat stocks for cracking, hydrocracking, and the like.

Olefin isomerization, comprising the shift of a double bond in an olefin, is suitably performed at 300 to 900° F., a pressure of 1 to 10 atmospheres, and an LHSV of 0.1 to 10. The process is of value in the manufacture of olefin addition products such as alcohols and alkyl halides.

The invention may be illustrated by the following examples:

EXAMPLE 1

A sample of braunite from Kyushu, Japan, and another from India, were each ground to about 5 microns particle size, pelleted, and then crushed to 12–25 mesh size. A 1-ml. aliquot of each was tested for n-hexane cracking activity at 1000° F., using the conventional alpha test. In this test, which is a micro test, the activity of the catalyst is reported in terms of alpha activity, by which is meant the conversion capability, as determined in the micro test, of the braunite by comparison with that of a conventional amorphous silica-alumina cracking catalyst (90% $SiO_2$—10% $AlO_2$) in the cracking of n-hexane. The particular silica-alumina catalyst referred to is one having an activity index, or A.I., of 46 as measured by the well-known Cat. A test, which is described in National Petroleum News 36 R–537 (Aug. 2, 1944). In the micro test, which is described in Journal of Catalysis No. 4, 527–529 (1965), the activity of the braunite is designated alpha, and represents the comparative activity of such catalyst relative to an activity of 1 for the conventional silica-alumina catalyst. The results appear below in Table I.

EXAMPLE 2

A 2-gram aliquot of Japanese braunite from Example 1 was base exchanged for 20 hours with 250 ml. of an aqueous solution of 1 normal ammonium chloride at room temperature. The filtrate of base exchange solution of ammonium chloride recovered after contact with the braunite, had a pH of 7.4, as against its original pH of 4.9, thus indicating it had become more alkaline. In other words, the solution was able to replace a considerable amount of alkali metal cations originally present in the braunite. The resulting braunite product was washed with water, dried for one hour at 105° C., calcined for three hours in dry air at 1000° F., and then tested for hexane cracking at 1000° F.

A sample of India braunite was treated in the same way. The results are shown in Table I. The following analyses of the mineral in percent by weight, before and after base exchange were made:

|  | Before, percent | | After, percent | |
| --- | --- | --- | --- | --- |
|  | Japan | India | Japan | India |
| Mn | 48.2 | 49.1 | 46.7 | 54.8 |
| $SiO_2$ | 15.3 | 6.26 | 18.9 | 5.87 |
| $Fe_2O_3$ | .39 | 1.58 |  | 3.13 |
| CaO |  | 27.3 |  | 1.74 |
| $Na_2O$ |  | .36 |  | .53 |

EXAMPLE 3

The catalyst materials resulting from the hexane cracking tests of Example 2 were subjected to regeneration by heating at 1000° F., for ½ hour in the presence of air flowing thereover at a rate of 20 ml./min. The regenerated catalysts were then tested in the described hexane cracking test at 900° F., with the results noted in Table I, which follows:

TABLE I

| Example | Catalyst | Alpha value | |
|---|---|---|---|
| | | Japan | India |
| 1 | Braunite, as received | 1.1 | 5.7 |
| 2 | Braunite, base-exchanged and calcined | 1.7 | 17 |
| 3 | Braunite of Example 2 after use and regeneration | 2.9 | 11 |

It will be seen that natural braunite from Japan is 1.1 times more active than conventional amorphous silica-alumina, the latter being considered to be a good cracking catalyst. The activity increases upon base exchange, and again after regeneration. The braunite from India was 5.7 times more active than the silica-alumina, 17 times more active after base exchange, and 11 times more active after regeneration. It is interesting to observe that the 46 A.I. silica-alumina has a surface area of 40 to 60 sq. m./g., as indicated by its cyclohexane sorption value of 1.7%, while natural braunite from Japan or India has a surface area of less than 5 sq. m./g.; thus, per unit of surface area, natural braunite from Japan or India has an activity more than 10 times greater than that of the silica-alumina.

EXAMPLE 4

Base-exchanged catalyst from Example 2 (from Japanese braunite) was tested for hydrogenation activity by passing over it a mixture of butene-1 and hydrogen (10:1, mole ratio) at 500° F., and vapor hourly space velocity of 3600, using a pulse technique. It was found that 4% of the butene charge was converted to n-butane and 31% to butene-2, indicating a hydrogenation activity of 4% and double bond isomerization activity of 31%.

EXAMPLE 5

Japanese braunite from Example 1 was tested for oxidation activity by passing over the same at 600° F. a mixture of air and 1-butene at 22.5:1 mole ratio and 3600 VHSV. This resulted in 34.6% of the butene charge being oxidized to carbon dioxide and water. In another similar oxidation test, the same catalyst proved itself to be at least equal in combustion activity to a commercial oxidation catalyst.

EXAMPLE 6

A 1:1 volume mixture was prepared of India braunite and a synthetic crystalline aluminosilicate identified as NaX. Of this mixture, a 1 ml. aliquot was taken and calcined for 15 minutes at 1000° F., and then tested for hexane cracking activity. It gave an alpha value of 7.3, which after regeneration increased to 7.4.

EXAMPLE 7

A 1:1 volume mixture was prepared of India braunite and Georgia kaolin, and of this a 1 ml. aliquot was taken and calcined for 15 minutes at 1000° F. After this, it was subjected to hexane cracking, producing an alpha value of 5.8. After regeneration, the alpha was the same.

EXAMPLE 8

A sample of manganese nodules from the Pacific Ocean was tested for hexane cracking, giving an alpha of 4.9. Then an aliquot of the same was base exchanged with ammonium chloride, as in Example 2, and 1 ml. aliquot was calcined at 1000° F., and tested for hexane cracking. It gave an alpha of 19.6.

As illustrated by Example 6, the invention contemplates mixing one or more base-exchanged minerals like braunite, or any of those described, with a crystalline aluminosilicate such as, by way of example, zeolite A, zeolite X, zeolite Y or other crystalline aluminosilicates described in U.S. Patent Nos. 3,140,252 and 3,140,253.

As will be apparent, the base-exchanged minerals described above as "composites" also comprise "catalysts."

It will be understood that the invention is capable of obvious variations without departing from its scope.

In light of the foregoing description, the following is claimed.

1. A catalyst comprising a base-exchanged, calcined manganese silicate-containing mineral having hydrogen ions bonded thereto in an amount of 0.01 to 0.5 gram per 100 gram of said mineral.

2. Catalyst of claim 1 wherein said base-exchanged calcined mineral is braunite.

3. Catalyst of claim 1 wherein said base-exchanged calcined mineral is rhodonite.

4. Catalyst of claim 1 wherein said base-exchanged calcined mineral is spessarite.

5. Catalyst of claim 1 wherein said base-exchanged calcined mineral is bementite.

6. Catalyst of claim 1 wherein said base-exchanged calcined mineral is helvite.

7. A catalyst for hydrocarbon conversion comprising a base-exchanged, calcined natural braunite, said braunite prior to base exchange containing alkali metal and/or alkaline earth metal cations which in said base exchanged and calcined braunite are replaced by hydrogen ions in an amount of 0.01 to 0.5 gram per 100 gram of said braunite, said catalyst having a n-hexane cracking activity greater than that of a conventional amorphous silica-lumina catalyst, and said cracking activity being regenerable after inactivation of the catalyst by inactivating deposits.

8. A catalyst comprising a base-exchanged manganese silicate-containing mineral having hydrogen ions bonded thereto in an amount of at least 0.01 gram per 100 gram of said mineral.

9. A method for making a catalyst useful in hydrocarbon conversions which comprises base-exchanging a manganese silicate-containing, alkali metal and/or alkaline earth metal cation-containing, natural mineral by treating the same with a fluid medium containing exchangeable hydrogen ion precursors, calcining it, and thereby producing a base-exchanged calcined manganese silicate-containing product having hydrogen ions bonded thereto in an amount of 0.01 to 0.5 gram per 100 gram of said product.

10. Method of claim 9 wherein said mineral is braunite containing exchangeable alkali metal and/or alkaline earth metal cations in an amount, expressed as calcium oxide, of about 0.05 to 1.2% by weight thereof, and wherein said base exchange is effected so that the resulting braunite material has hydrogen ion precursors bonded thereto, and wherein said calcining step produces hydrogen ions bonded to the braunite material in an amount of at least 0.01 gram per 100 gram of said braunite material.

11. The method of claim 10 wherein said base exchange comprises treating the braunite with a solution of a salt capable of supplying hydrogen ion precursors selected from ammonium, alkylammonium, and arylammonium ions, thereby to replace at least a portion of said alkali metal and/or alkaline earth metal cations by said precursors.

12. Method of converting a hydrocarbon which comprises contacting the same under conversion conditions with the catalyst of claim 8.

13. Method of claim 12 wherein said converting step is a cracking step carried out under cracking conditions.

14. Method of claim 12 wherein said converting step comprises hydrogenating an olefin in the presence of hydrogen and under hydrogenating conditions.

15. Method of claim 12 wherein said converting step comprises isomerizing an olefin under isomerization conditions.

16. Method of claim 12 wherein said converting step comprises oxidizing a hydrocarbon in the presence of oxygen and under oxidizing conditions.

17. Method of claim 12 wherein said converting step is a hydrocracking step carried out in the presence of hydrogen and under hydrocracking conditions.

18. Method of cracking hydrocarbons which comprises contacting the hydrocarbons under cracking conditions with a manganese silicate-containing mineral.

References Cited

UNITED STATES PATENTS 2,265,389  12/1941  Melaven et al. _____ 208—119
2,271,318  1/1942   Thomas et al. _____ 208—120
3,082,080  3/1963   Simons _____ 23—58 X
3,264,208  8/1966   Plank et al. _____ 208—120

DANIEL E. WYMAN, Primary Examiner
C. F. DEES, Assistant Examiner

U.S. Cl. X.R.

23—111; 208—119; 252—454, 471; 260—683.2, 687